(12) United States Patent
Hung (10) Patent No.: US 8,744,416 B2
(45) Date of Patent: Jun. 3, 2014

(54) METHOD FOR ADJUSTING RING VOLUME THROUGH SHORT MESSAGE SERVICE

(75) Inventor: Kuo-Hao Hung, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 111 days.

(21) Appl. No.: 13/607,795

(22) Filed: Sep. 9, 2012

(65) Prior Publication Data

US 2013/0337783 A1 Dec. 19, 2013

(30) Foreign Application Priority Data

Jun. 19, 2012 (TW) .............................. 101121918 A (51) Int. Cl.
*H04M 3/42* (2006.01)
(52) U.S. Cl.
USPC ...................... 455/414.1; 455/412.1; 455/418; 455/419; 455/420; 455/458
(58) Field of Classification Search
USPC ........... 455/414.1, 412.1, 418, 419, 420, 458; 381/59, 315, 320
See application file for complete search history.

(56) References Cited

U.S. PATENT DOCUMENTS

| 2008/0075271 | A1 | 3/2008 | Bostick |
| 2010/0190474 | A1* | 7/2010 | Rajguru ..................... 455/412.1 |
| 2010/0222084 | A1* | 9/2010 | Butterfield et al. ........... 455/458 |
| 2011/0085687 | A1* | 4/2011 | Edgar ........................... 381/315 |

* cited by examiner

*Primary Examiner* — Manpreet Matharu
(74) *Attorney, Agent, or Firm* — Winston Hsu; Scott Margo (57) ABSTRACT

A method for adjusting ring volume through short message service includes steps of a communication device determining whether a volume adjusting condition is satisfied when there is a missed call; the communication device transmitting a first short message if the volume adjusting condition has been satisfied, wherein a first information element identifier (IEI) is set in the first short message and defined as a volume adjusting request in transfer protocol user data (TPUD) in advance; the communication device determining whether a second IEI is set in a second short message when receiving the second short message, wherein the second IEI is defined as a volume adjusting response in TPUD in advance; and the communication device selectively adjusting a ring volume thereof to maximum level if the second IEI is set in the second short message.

19 Claims, 4 Drawing Sheets

METHOD FOR ADJUSTING RING VOLUME THROUGH SHORT MESSAGE SERVICE

BACKGROUND OF THE INVENTION

1. Field of the Invention

The invention relates to a method for adjusting ring volume through short message service and, more particularly, to a method capable of enabling one communication device to adjust ring volume of another communication device to maximum level through short message service.

2. Description of the Prior Art

So far mobile phone is considered a necessity by a lot of people. In general, a user may selectively set ring volume of the mobile phone to silent mode, vibration mode, ring mode and so on for different conditions. Also, the ring volume may be set to different levels under the ring mode. When a user attends a meeting or is not allowed to generate noise at a place, such as movie theater, music performance and so on, he or she usually sets the mobile phone to silent mode or vibration mode. If the user does not notice that there is an incoming call, the user forgets to set the mobile phone back to ring mode after the event, or the ring volume is too small, he or she will miss some urgent calls accordingly.

SUMMARY OF THE INVENTION

The invention provides a method for adjusting ring volume through short message service. The method is capable of enabling one communication device to adjust ring volume of another communication device to maximum level through short message service, so as to solve the aforesaid problems.

According to the claimed invention, a method for adjusting ring volume through short message service comprises steps of operating a first communication device to make a phone call to a second communication device; the second communication device determining whether a volume adjusting condition is satisfied if the second communication device does not answer the phone call; the second communication device transmitting a first short message to the first communication device if the volume adjusting condition has been satisfied, wherein a first information element identifier (IEI) is set in the first short message and defined as a volume adjusting request in transfer protocol user data (TPUD) in advance; the first communication device generating a reply interface according to the first IEI set in the first short message, wherein the reply interface is used for selecting whether to adjust a ring volume of the second communication device to a maximum level; the first communication device transmitting a second short message to the second communication device if selecting to adjust the ring volume of the second communication device to the maximum level, wherein the second IEI is defined as a volume adjusting response in TPUD in advance; and the second communication device selectively adjusting the ring volume to the maximum level according to the second IEI set in the second short message.

According to the claimed invention, the volume adjusting condition comprises that a number of missed calls made by the first communication device have to be more than a first threshold.

According to the claimed invention, the volume adjusting condition further comprises that the ring volume of the second communication device has not been set to the maximum level yet.

According to the claimed invention, the volume adjusting condition further comprises that a time period between a first missed call and a last missed call of the missed calls has to be less than a second threshold.

According to the claimed invention, the second communication device stores an allowable list and the volume adjusting condition further comprises that a phone number of the first communication device has to be recorded in the allowable list.

According to the claimed invention, the method further comprises steps of the second communication device adding a notification content to the first short message when the second communication device transmits the first short message to the first communication device, wherein the notification content is set in the second communication device in advance; and the first communication device displaying the notification content in the reply interface.

According to the claimed invention, the method further comprises steps of the second communication device starting to count time and determining whether to receive the second short message within a predetermined time period when the second communication device transmits the first short message to the first communication device; the second communication device adjusting the ring volume to the maximum level according to the second IEI set in the second short message if the second communication device receives the second short message within the predetermined time period; and the second communication device not adjusting the ring volume if the second communication device receives the second short message beyond the predetermined time period.

According to the claimed invention, the method further comprises step of the second communication device transmitting the first short message to the first communication device and broadcasting a warning sound simultaneously if the volume adjusting condition has been satisfied.

According to the claimed invention, the method further comprises step of the second communication device broadcasting the warning sound discontinuously.

According to the claimed invention, the method further comprises steps of the second communication device determining whether an incoming call is made by the first communication device when the second communication device receives the incoming call after adjusting the ring volume to the maximum level; the second communication device ringing by the maximum level of the ring volume if the incoming call is made by the first communication device; and the second communication device ringing by the ring volume before adjustment if the incoming call is not made by the first communication device.

According to the claimed invention, a method for adjusting ring volume through short message service comprises steps of a communication device determining whether a volume adjusting condition is satisfied when there is a missed call; the communication device transmitting a first short message if the volume adjusting condition has been satisfied, wherein a first information element identifier (IEI) is set in the first short message and defined as a volume adjusting request in transfer protocol user data (TPUD) in advance; the communication device determining whether a second IEI is set in a second short message when the communication device receives the second short message, wherein the second short message is generated in response to the first short message and the second IEI is defined as a volume adjusting response in TPUD in advance; and the communication device selectively adjusting a ring volume thereof to maximum level according to the second IEI if the second IEI is set in the second short message.

According to the claimed invention, the volume adjusting condition comprises that a number of the missed calls have to be more than a first threshold.

According to the claimed invention, the volume adjusting condition further comprises that the ring volume of the communication device has not been set to the maximum level yet.

According to the claimed invention, the volume adjusting condition further comprises that a time period between a first missed call and a last missed call of the missed calls has to be less than a second threshold.

According to the claimed invention, the communication device stores an allowable list and the volume adjusting condition further comprises that a phone number of the missed call has to be recorded in the allowable list.

According to the claimed invention, the method further comprises step of the communication device adding a notification content to the first short message when the communication device transmits the first short message, wherein the notification content is set in the communication device in advance.

According to the claimed invention, the method further comprises steps of the communication device starting to count time and determining whether to receive the second short message within a predetermined time period when the communication device transmits the first short message; the communication device adjusting the ring volume to the maximum level according to the second IEI set in the second short message if the communication device receives the second short message within the predetermined time period; and the communication device not adjusting the ring volume if the communication device receives the second short message beyond the predetermined time period.

According to the claimed invention, the method further comprises step of the communication device transmitting the first short message and broadcasting a warning sound simultaneously if the volume adjusting condition has been satisfied.

According to the claimed invention, the method further comprises step of the communication device broadcasting the warning sound discontinuously.

As mentioned in the above, the invention utilizes IEI to define "volume adjusting request" and "volume adjusting response" in TPUD. When a user operates the first communication device to make a phone call to the second communication device and the second communication device does not answer the phone call, the second communication device will determine whether the volume adjusting condition is satisfied first, wherein the volume adjusting condition may comprise a number of missed calls made by the first communication device have to be more than a first threshold (e.g. five), the ring volume of the second communication device has not been set to the maximum level yet, a time period between a first missed call and a last missed call of the missed calls has to be less than a second threshold (e.g. thirty minutes) and/or a phone number of the first communication device has to be recorded in the allowable list.

If the volume adjusting condition has been satisfied, the second communication device will set one IEI of TPUD in the first short message as "volume adjusting request". When another user reads the first short message on the first communication device, the first communication device will compare whether the IEI of TPUD is defined as "volume adjusting request". If the IEI of TPUD is defined as "volume adjusting request", the user can operate the first communication device to select whether to adjust the ring volume of the second communication device to the maximum level. If the user selects to adjust the ring volume of the second communication device to the maximum level, the first communication device will transmit the second short message to the second communication device, wherein one IEI of TPUD in the second short message is set as "volume adjusting response". After receiving the second short message from the first communication device, the second communication device will adjust the ring volume to the maximum level according to the IEI of "volume adjusting response" set in the second short message. When the second communication device receives an incoming call after adjusting the ring volume to the maximum level, the second communication device can ring by the maximum level of the ring volume so as to prevent the user from missing urgent calls due to silent mode, vibration mode or small ring volume.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
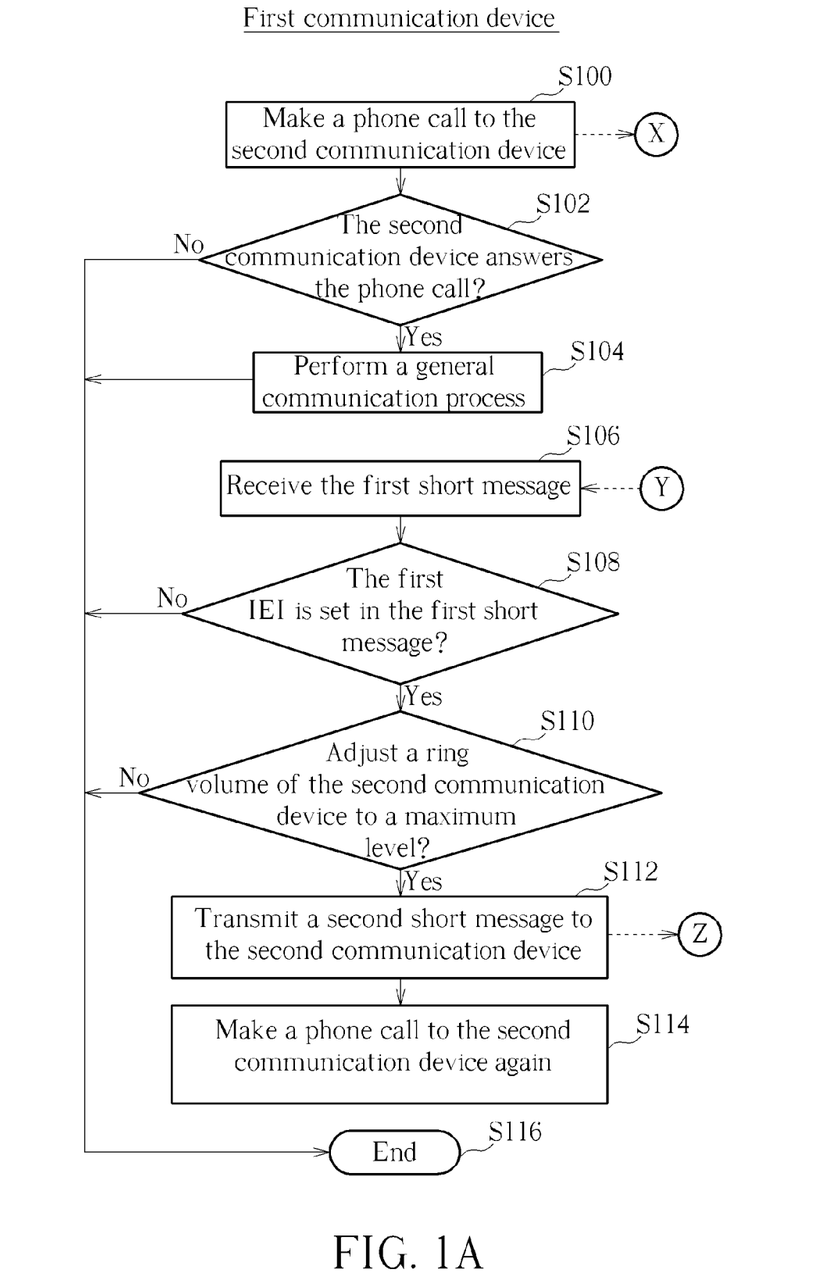
FIGS. 1A and 1B are flowcharts illustrating a method for adjusting ring volume through short message service according to an embodiment of the invention.
Figure 1B:
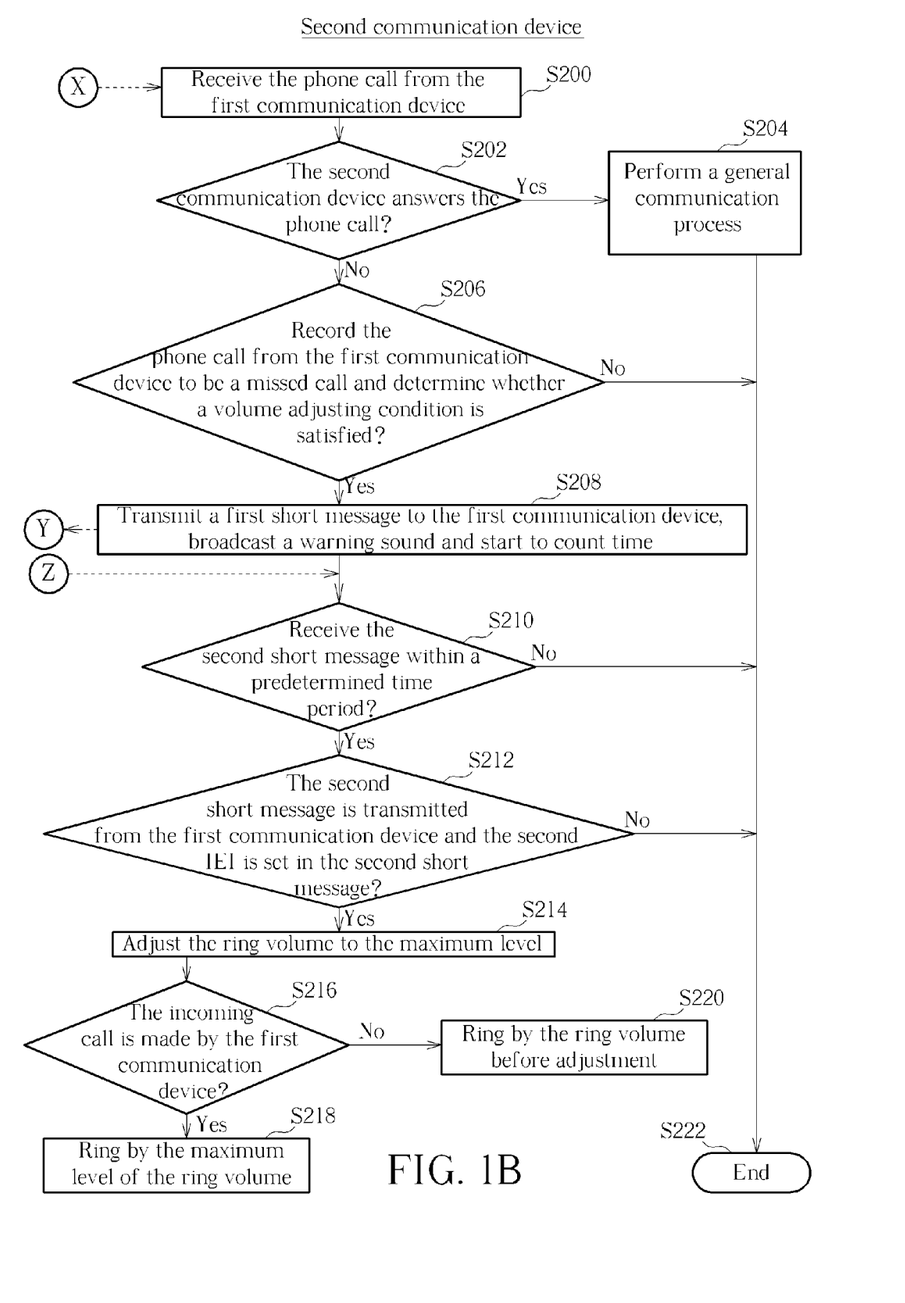
Figure 2:
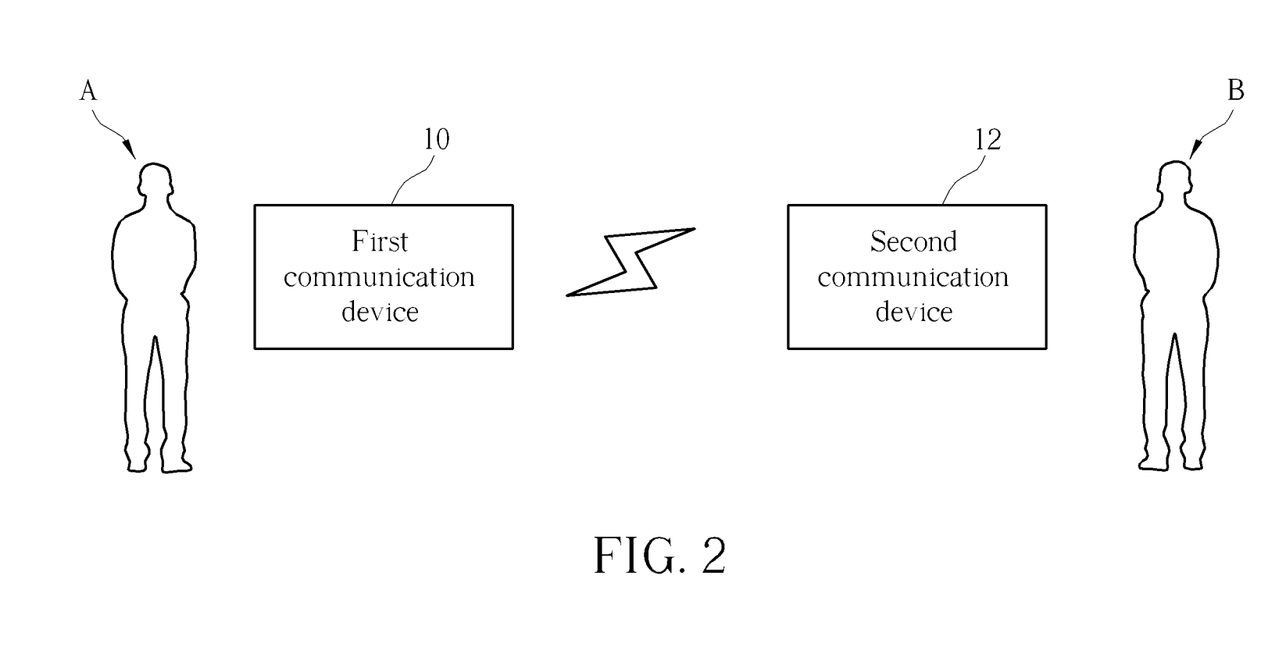
FIG. 2 is a schematic diagram illustrating a first communication device and a second communication device used for implementing the method shown in FIGS. 1A and 1B.
Figure 3:
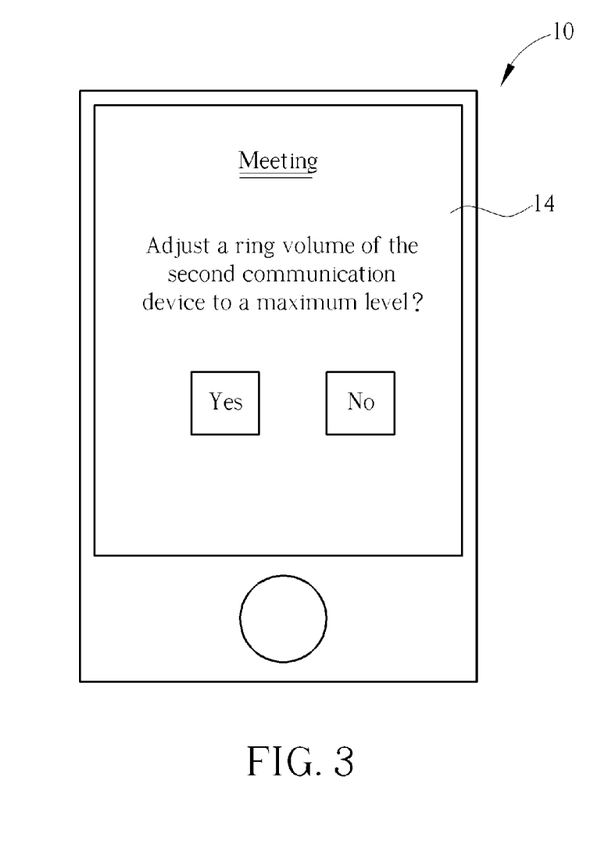
FIG. 3 is a schematic diagram illustrating a reply interface generated by the first communication device shown in FIG. 2 according to a first short message.

Referring to FIGS. 1A to 3, FIGS. 1A and 1B are flowcharts illustrating a method for adjusting ring volume through short message service according to an embodiment of the invention, FIG. 2 is a schematic diagram illustrating a first communication device 10 and a second communication device 12 used for implementing the method shown in FIGS. 1A and 1B, and FIG. 3 is a schematic diagram illustrating a reply interface 14 generated by the first communication device 10 shown in FIG. 2 according to a first short message. The first communication device 10 and the second communication device 12 may be any communication devices capable of making and answering a phone call, such as mobile phone, flat computer, personal digital assistant (PDA) and so on.

The invention defines a first information element identifier (IEI) as a volume adjusting request and defines a second IEI as a volume adjusting response in transfer protocol user data (TPUD) in advance. In other words, the invention utilizes TPUD of short message service (SMS) to adjust ring volume without changing SMS protocol in mobile communication network. It should be noted that in IEI's definition of TPUD, 0A-6F, A0-BF and E0-FF are reserved for future applications. Therefore, for example, the invention may set the first IEI of TPUD as "6F" for the definition of "volume adjusting request" and set the second IEI of TPUD as "BF" for the definition of "volume adjusting response". It should be noted that the first IEI and the second IEI are not limited to be set as 6F and BF and may be set as any two of 0A-6F, A0-BF and E0-FF.

After the aforesaid setting is done, a user A operates the first communication device 10 to make a phone call to the second communication device 12 in step S100 and the second communication device 12 receives the phone call from the first communication device 10 in step S200. Afterward, step S102 and step S202 are performed to determine whether the second communication device 12 answers the phone call from the first communication device 10. If the second communication device 12 answers the phone call from the first communication device 10, the first communication device 10 and the second communication device 12 perform a general communication process in step S104 and step S204. If the second communication device 12 does not answer the phone call from the first communication device 10 and a volume adjusting function has been turned on in the second communication device 12, the second communication device 12 records the phone call from the first communication device 10 to be a missed call and determines whether a volume adjusting condition is satisfied in step S206. It should be noted that if the second communication device 12 does not answer the phone call from the first communication device 10 and the volume adjusting function has not been turned on in the second communication device 12 yet, the second communication device 12 only records the phone call from the first communication device 10 to be a missed call. In other words, the invention allows a user to select whether to turn on or turn off the volume adjusting function or allows the volume adjusting function to be turned on automatically when the communication device is set to silent mode or vibration mode. Furthermore, if the second communication device 12 does not answer the phone call from the first communication device 10, the first communication device 10 goes to the end process in step S116.

In this embodiment, the aforesaid volume adjusting condition may comprise at least one of the following conditions:

First condition: a number of missed calls made by the first communication device 10 have to be more than a first threshold (e.g. five);

Second condition: the ring volume of the second communication device 12 has not been set to the maximum level yet;

Third condition: a time period between a first missed call and a last missed call of the missed calls has to be less than a second threshold (e.g. thirty minutes); and Fourth condition: a phone number of the first communication device 10 has to be recorded in an allowable list.

Regarding the first condition, if the first threshold is set as five, the second communication device 12 will turn on the volume adjusting function of the invention when a number of missed calls made by the first communication device 10 are more than five (i.e. six). Regarding to the second condition, the second communication device 12 will turn on the volume adjusting function of the invention when the ring volume of the second communication device 12 has not been set to the maximum level yet. Regarding the third condition, if the second threshold is set as thirty minutes and a number of missed calls are six, the second communication device 12 will turn on the volume adjusting function of the invention when a time period between the first missed call and the last missed call is less than thirty minutes. Regarding the fourth condition, if the second communication device 12 stores an allowable list, the second communication device 12 will turn on the volume adjusting function of the invention when a phone number of the first communication device 10 is recorded in the allowable list. The aforesaid first and second thresholds can be set by the user. Furthermore, the user can establish the aforesaid allowable list in the second communication device 12 in advance and add phone numbers of family, friends or other important persons to the allowable list. If a phone number of a missed call is not recorded in the allowable list, the second communication device 12 will not turn on the volume adjusting function of the invention accordingly so as to prevent pranks or the like.

It should be noted that the volume adjusting condition of the invention may comprise all of the aforesaid first to fourth conditions or only comprise any one, two or three of the aforesaid first to fourth conditions and it depends on practical applications.

If the volume adjusting condition is not satisfied, the second communication device 12 terminates the volume adjusting function of the invention and then goes to the end process in step S222 after recording the phone call from the first communication device 10 to be a missed call. If the user A continues to operate the first communication device 10 to make phone calls to the second communication device 12 so as to satisfy the volume adjusting condition, the phone calls made by the first communication device 10 are taken to be urgent calls. Then, the second communication device 12 transmits a first short message to the first communication device 10 and broadcasts a warning sound simultaneously in step S208. In this embodiment, the second communication device 12 will set one IEI of TPUD as the first IEI "6F" in the first short message and set a first information element data (IED) as a serial number corresponding to the first short message in the first short message. The aforesaid warning sound can be set by the user B and is used for attracting attention to the user B. In this embodiment, the second communication device 12 may broadcast the warning sound discontinuously so as to attract attention to the user B. When the user B hears the warning sound broadcasted by the second communication device 12, he or she will perceive there are several missed calls from the first communication device 10 and then call backs the user A in time.

After the first communication device 10 receives the aforesaid first short message in step S106, the first communication device 10 will determine whether one IEI of TPUD in the first short message is defined as the first IEI "6F" in step S108. If the first IEI "6F" is set in the first short message, the first communication device 10 generates a reply interface 14 (as shown in FIG. 3) according to the first IEI "6F" set in the first short message, wherein the reply interface 14 is used for the user A to select whether to adjust a ring volume of the second communication device 12 to a maximum level in step S110. In this embodiment, when the second communication device 12 transmits the first short message to the first communication device 10, the second communication device 12 can add a notification content to the first short message. The notification content can be set in the second communication device 12 in advance by the user B and is used for notifying the user A why the user B cannot answer the phone call. For example, the notification content may be "meeting", "driving", "attending class", etc. Then, the first communication device 10 will display the notification content of the first short message in the reply interface 14. If the first IEI "6F" is not set in the first short message, the first communication device 10 goes to the end process in step S116.

If the user A selects to adjust the ring volume of the second communication device 12 to the maximum level through the reply interface 14, the first communication device 10 will transmit a second short message to the second communication device 12 in step S112. In this embodiment, the first communication device 10 will set one IEI of TPUD in the second short message as the second IEI "BF" and set a second IED as the serial number corresponding to the first short message in the second short message. If the user A selects to not adjust the ring volume of the second communication device 12 to the maximum level through the reply interface 14, the first communication device 10 goes to the end process in step S116.

In this embodiment, when the second communication device 12 transmits the first short message to the first communication device 10, the second communication device 12 will start to count time in step S208 except broadcast the aforesaid warning sound. Afterward, the second communication device 12 determines whether to receive the second short message from the first communication device 10 within a predetermined time period (e.g. ten minutes) in step S210, wherein the predetermined time period can be set by the user. If the second communication device 12 receives the second short message beyond the predetermined time period, the second communication device 12 will not adjust the ring volume and goes to the end process in step S222. If the second communication device 12 receives the second short message within the predetermined time period, the second communication device 12 will determine whether the second short message is transmitted from the first communication device 10 and determine whether one IEI of TPUD in the second short message is defined as the second IEI "BF" in step S212. If the second short message is transmitted from the first communication device 10 and the second IEI "BF" is set in the second short message, the second communication device 12 will adjust the ring volume to the maximum level according to the second IEI "BF" set in the second short message in step S214. If the second short message is not transmitted from the first communication device 10 or the second IEI "BF" is not set in the second short message, the second communication device 12 goes to the end process in step S222.

Accordingly, after selecting to adjust the ring volume of the second communication device 12 to the maximum level through the reply interface 14, the user A can operate the first communication device 10 to make a phone call to the second communication device 12 again in step S114. Then, the second communication device 12 will ring by the maximum level of the ring volume when receiving an incoming call from the first communication device 10, so as to attract attention to user B. In this embodiment, when the second communication device 12 receives an incoming call after adjusting the ring volume to the maximum level, the second communication device 12 may determine whether the incoming call is made by the first communication device 10 in step S216. If the incoming call is made by the first communication device 10, the second communication device 12 rings by the maximum level of the ring volume in step S218. If the incoming call is not made by the first communication device 10, the second communication device 12 rings by the ring volume before adjustment in step S220. In other words, only the incoming call from the first communication device 10 is taken as an urgent call and then the second communication device 12 rings by the maximum level of the ring volume, so as to attract attention to the user B. Accordingly, the user B will not be disturbed by other non-urgent calls. It should be noted that after adjusting the ring volume to the maximum level, the second communication device 12 may also ring by the maximum level of the ring volume for any incoming calls so as to enable the user B to perceive there are missed calls.

It should be noted that if the user B has perceived there are missed calls from the first communication device 10 and called back before the ring volume is adjusted to the maximum level, the number of missed calls from the first communication device 10 will be erased and the volume adjusting function of the invention will be terminated accordingly.

Furthermore, the control logic of the method for adjusting ring volume through short message service shown in FIGS. 1A and 1B can be implemented by software. Needless to say, each part or function of the control logic may be implemented by software, hardware or the combination thereof.

As mentioned in the above, the invention utilizes IEI to define "volume adjusting request" and "volume adjusting response" in TPUD. When a user operates the first communication device to make a phone call to the second communication device and the second communication device does not answer the phone call, the second communication device will determine whether the volume adjusting condition is satisfied first, wherein the volume adjusting condition may comprise a number of missed calls made by the first communication device have to be more than a first threshold (e.g. five), the ring volume of the second communication device is not set to the maximum level yet, a time period between a first missed call and a last missed call of the missed calls has to be less than a second threshold (e.g. thirty minutes) and/or a phone number of the first communication device has to be recorded in the allowable list.

If the volume adjusting condition has been satisfied, the second communication device will set one IEI of TPUD in the first short message as "volume adjusting request". When another user reads the first short message on the first communication device, the first communication device will compare whether the IEI of TPUD is defined as "volume adjusting request". If the IEI of TPUD is defined as "volume adjusting request", the user can operate the first communication device to select whether to adjust the ring volume of the second communication device to the maximum level. If the user selects to adjust the ring volume of the second communication device to the maximum level, the first communication device will transmit the second short message to the second communication device, wherein one IEI of TPUD in the second short message is set as "volume adjusting response". After receiving the second short message from the first communication device, the second communication device will adjust the ring volume to the maximum level according to the IEI of "volume adjusting response" set in the second short message. When the second communication device receives an incoming call after adjusting the ring volume to the maximum level, the second communication device can ring by the maximum level of the ring volume so as to prevent the user from missing urgent calls due to silent mode, vibration mode or small ring volume.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for adjusting ring volume through short message service comprising:
    operating a first communication device to make a phone call to a second communication;
    the second communication device determining whether a volume adjusting condition is satisfied if the second communication device does not answer the phone call;
    the second communication device transmitting a first short message to the first communication device if the volume adjusting condition has been satisfied, wherein a first information element identifier (IEI) is set in the first short message and defined as a volume adjusting request in transfer protocol user data (TPUD) in advance;
    the first communication device generating a reply interface according to the first IEI set in the first short message, wherein the reply interface is used for selecting whether to adjust a ring volume of the second communication device to a maximum level;

the first communication device transmitting a second short message to the second communication device if selecting to adjust the ring volume of the second communication device to the maximum level, wherein the second IEI is defined as a volume adjusting response in TPUD in advance; and the second communication device selectively adjusting the ring volume to the maximum level according to the second IEI set in the second short message.

2. The method of claim 1, wherein the volume adjusting condition comprises that a number of missed calls made by the first communication device have to be more than a first threshold.

3. The method of claim 2, wherein the volume adjusting condition further comprises that the ring volume of the second communication device has not been set to the maximum level yet.

4. The method of claim 3, wherein the volume adjusting condition further comprises that a time period between a first missed call and a last missed call of the missed calls has to be less than a second threshold.

5. The method of claim 4, wherein the second communication device stores an allowable list and the volume adjusting condition further comprises that a phone number of the first communication device has to be recorded in the allowable list.

6. The method of claim 1, further comprising:
the second communication device adding a notification content to the first short message when the second communication device transmits the first short message to the first communication device, wherein the notification content is set in the second communication device in advance; and
the first communication device displaying the notification content in the reply interface.

7. The method of claim 1, further comprising:
the second communication device starting to count time and determining whether to receive the second short message within a predetermined time period when the second communication device transmits the first short message to the first communication device;
the second communication device adjusting the ring volume to the maximum level according to the second IEI set in the second short message if the second communication device receives the second short message within the predetermined time period; and
the second communication device not adjusting the ring volume if the second communication device receives the second short message beyond the predetermined time period.

8. The method of claim 1, further comprising:
the second communication device transmitting the first short message to the first communication device and broadcasting a warning sound simultaneously if the volume adjusting condition has been satisfied.

9. The method of claim 8, further comprising:
the second communication device broadcasting the warning sound discontinuously.

10. The method of claim 1, further comprising:
the second communication device determining whether an incoming call is made by the first communication device when the second communication device receives the incoming call after adjusting the ring volume to the maximum level;
the second communication device ringing by the maximum level of the ring volume if the incoming call is made by the first communication device; and
the second communication device ringing by the ring volume before adjustment if the incoming call is not made by the first communication device.

11. A method for adjusting ring volume through short message service comprising:
a communication device determining whether a volume adjusting condition is satisfied when there is a missed call;
the communication device transmitting a first short message if the volume adjusting condition has been satisfied, wherein a first information element identifier (IEI) is set in the first short message and defined as a volume adjusting request in transfer protocol user data (TPUD) in advance;
the communication device determining whether a second IEI is set in a second short message when the communication device receives the second short message, wherein the second short message is generated in response to the first short message and the second IEI is defined as a volume adjusting response in TPUD in advance; and
the communication device selectively adjusting a ring volume thereof to maximum level according to the second IEI if the second IEI is set in the second short message.

12. The method of claim 11, wherein the volume adjusting condition comprises that a number of the missed calls have to be more than a first threshold.

13. The method of claim 12, wherein the volume adjusting condition further comprises that the ring volume of the communication device has not been set to the maximum level yet.

14. The method of claim 13, wherein the volume adjusting condition further comprises that a time period between a first missed call and a last missed call of the missed calls has to be less than a second threshold.

15. The method of claim 14, wherein the communication device stores an allowable list and the volume adjusting condition further comprises that a phone number of the missed call has to be recorded in the allowable list.

16. The method of claim 11, further comprising:
the communication device adding a notification content to the first short message when the communication device transmits the first short message, wherein the notification content is set in the communication device in advance.

17. The method of claim 11, further comprising:
the communication device starting to count time and determining whether to receive the second short message within a predetermined time period when the communication device transmits the first short message;
the communication device adjusting the ring volume to the maximum level according to the second IEI set in the second short message if the communication device receives the second short message within the predetermined time period; and
the communication device not adjusting the ring volume if the communication device receives the second short message beyond the predetermined time period.

18. The method of claim 11, further comprising:
the communication device transmitting the first short message and broadcasting a warning sound simultaneously if the volume adjusting condition has been satisfied.

19. The method of claim 18, further comprising:
the communication device broadcasting the warning sound discontinuously.

* * * * *